Dec. 28, 1965 S. ROSIN 3,226,556
PHOTOSENSITIVE LIQUID EXAMINING MEANS FOR
ELECTROPHORESIS APPARATUS
Filed April 16, 1962 2 Sheets-Sheet 1
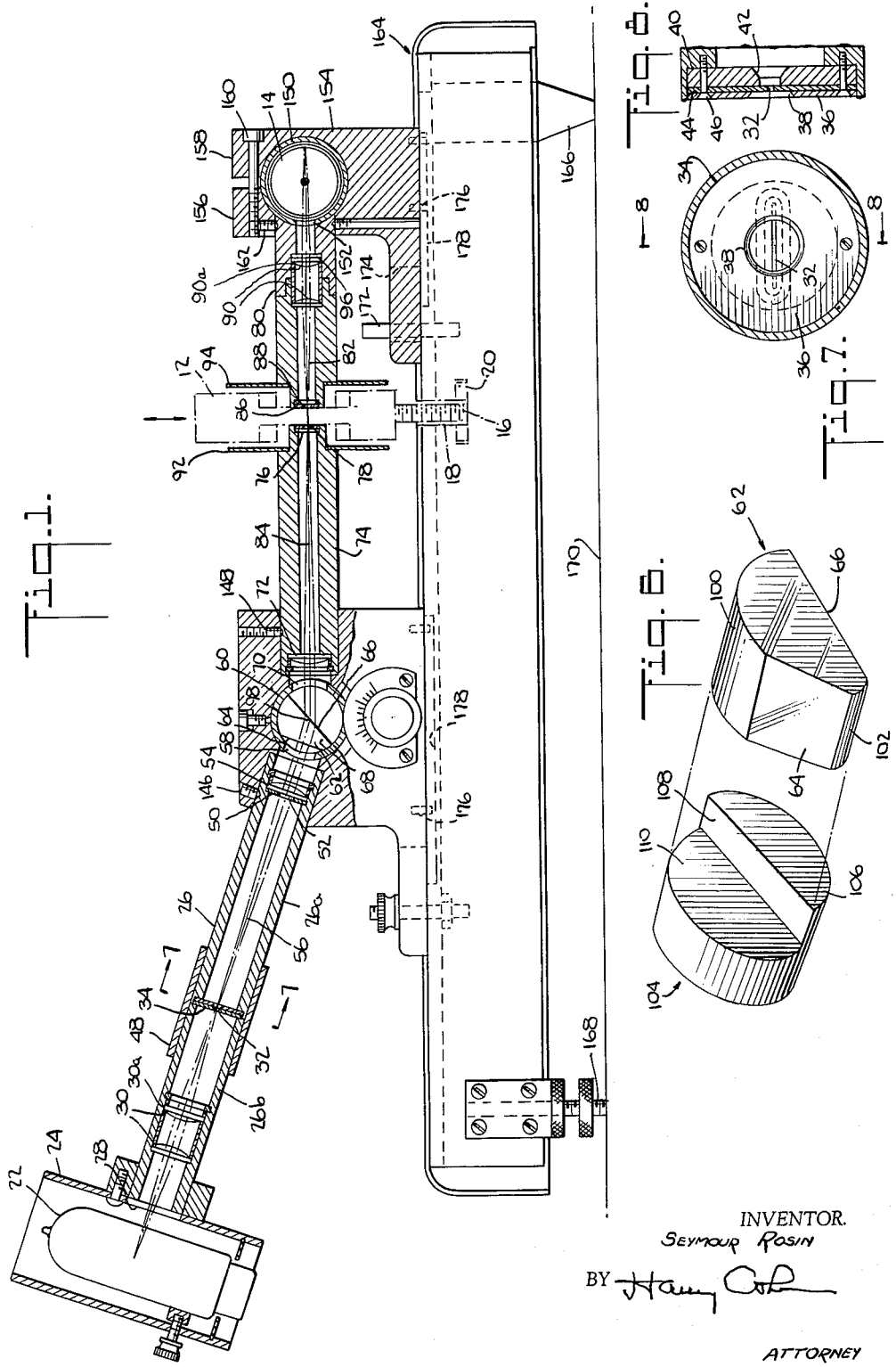
INVENTOR.
SEYMOUR ROSIN
BY
ATTORNEY

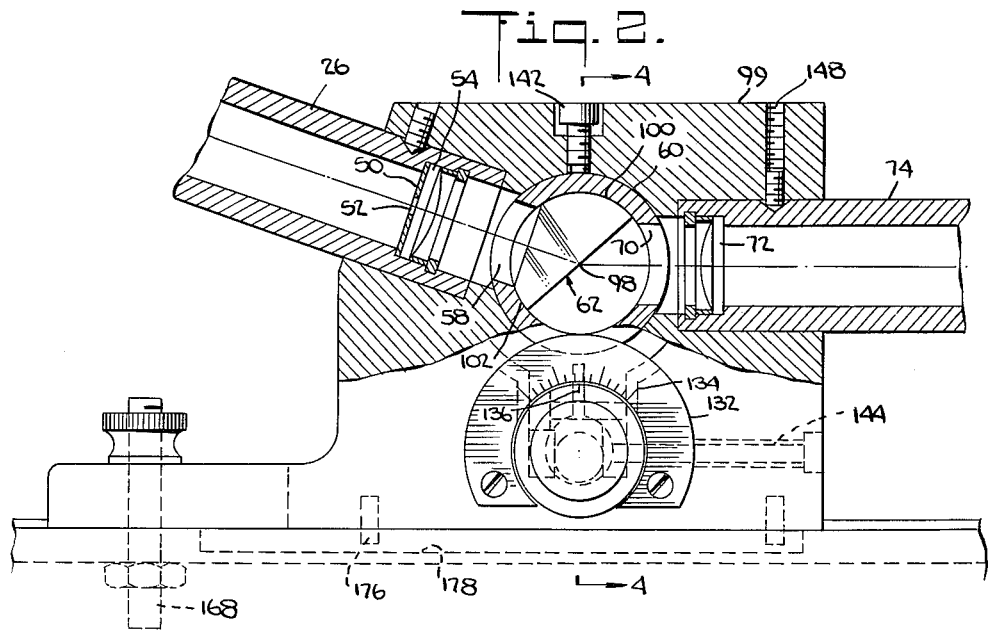
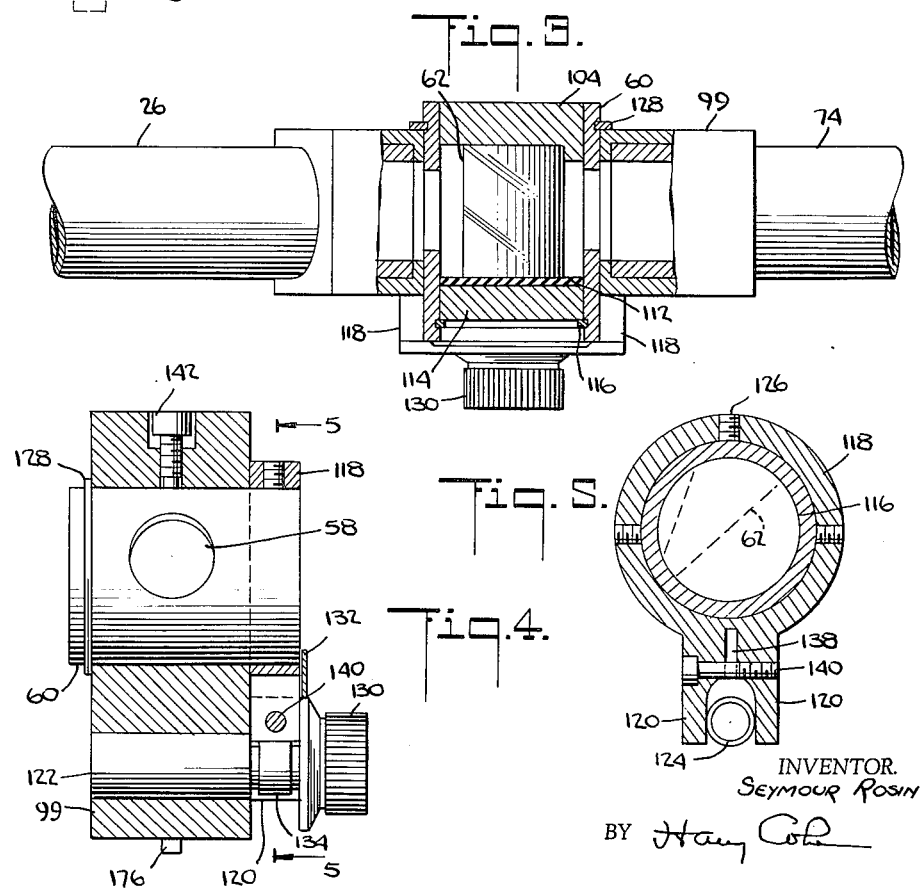

United States Patent Office 3,226,556
Patented Dec. 28, 1965

3,226,556
PHOTOSENSITIVE LIQUID EXAMINING MEANS
FOR ELECTROPHORESIS APPARATUS
Seymour Rosin, Massapequa Park, N.Y., assignor to Technicon Instruments Corporation, Chauncey, N.Y., a corporation of New York
Filed Apr. 16, 1962, Ser. No. 187,709
14 Claims. (Cl. 250—226)

This invention relates to electrophoresis apparatus and, more particularly, to liquid examining means for such apparatus for the analysis of a sample liquid or of a series of samples of an ampholyte or a mixture of ampholytes, for example, but without limitation, a protein or a mixture of proteins, or other liquids whose constituents or some of them can be separated by electrophoretic action. While useful for other purposes, the apparatus of the present invention is especially useful in conjunction with an electrophoresis cell for examining the separation of blood serum proteins, for instance, into the fractions albumin, alpha globulin, beta globulin and gamma globulin and their subfractions.

The fractionation of the plasma proteins by electrophoresis is referred to, for example, in Practical Psychological Chemistry, by Hawk, Oser and Summerson, 12th edition, published in 1947 by the Blakiston Company of Philadelphia, Pennsylvania. As there described, the electrophoretic separation of the proteins of a plasma sample is based on the difference in mobility of the various protein ions under the influence of a potential gradient, as a result of which the more highly charged albumin ions migrate at a faster rate than the globulin ions.

One of the objects of the present invention is the provision of apparatus for examining the liquid in an electrophoresis cell which includes extremely accurate means for providing radiation of a predetermined wave length to examine the liquid.

Another object is the provision of liquid examining apparatus with means for providing a relatively intense beam of radiation of a predetermined wave length and which is relatively narrow in height, for examining liquids in an electrophoresis cell wherein the liquid examining apparatus and the cell are mounted for relative movement with respect to each other for scanning of the liquid in the cell by said beam of radiation.

A further object is to provide liquid examining apparatus of the type indicated having means for varying the wave length of the radiation which is transmitted to the electrophoresis cell.

Another object is generally to provide improved liquid examining apparatus which is especially well adapted to examine the separated layers of the different constituents of a liquid in an electrophoresis cell.

The above and other objects, features and advantages of the invention will be more fully understood from the following description of the invention considered in connection with the accompanying illustrative drawings of the presently preferred embodiment of the invention.

In the drawings:

FIG. 1 is a side elevational view, partly in section, of the apparatus according to the invention;

FIG. 2 is a vertical view, partly in section, of part of the apparatus shown in FIG. 1 and on a larger scale;

FIG. 3 is a top plan view, partly in section, of the apparatus shown in FIG. 2;

FIG. 4 is a vertical sectional view taken on line 4—4 of FIG. 2;

FIG. 5 is a vertical sectional view taken on line 5—5 of FIG. 4;

FIG. 6 is a perspective view of parts of the apparatus in disassembled condition, illustrating their relative positions;

FIG. 7 is a cross section taken on line 7—7 of FIG. 1, on a larger scale; and

FIG. 8 is a vertical sectional view taken on line 8—8 of FIG. 7.

Referring now to the drawings in detail, the liquid examining apparatus of the present invention is operated to direct a horizontal beam of radiation, of predetermined wave length, at the stratified layers of liquid in an electrophoresis cell 12 which is mounted for vertical movement transversely of the radiation so that the liquid in the cell is scanned by said radiation for examination of each of the constituent layers seriatim. As is well known, the amount of absorption of the radiation by each layer is proportional to the quantity of the constituent present in the liquid. The non-absorbed radiation is transmitted from the electrophoresis cell to a photomultiplier tube 14 which operates a recorder (not shown) of the current-ration null-balancing type for recording the results of the examination of the liquid by the radiation. The stylus of the recorder is operated by the movable tap of a slide wire of the recorder and it will be understood that the deflection of the stylus is directly proportional to the concentration of the constituents of a substance in the liquid sample which is introduced into the cell. The record provided by the recorder is a measure of the radiation absorption of the liquid in the electrophoresis cell and is plotted on the chart paper of the recorder against the vertical position of the radiation in reference to its position in the cell.

As herein shown, the electrophoresis cell is mounted for vertical rectilinear movements with respect to liquid examining apparatus as disclosed in the application of Jack Isreeli, Serial No. 187,515, filed April 16, 1962, and owned by the assignee of my present application. Briefly described, the mechanism for moving the cell vertically up and down comprises a threaded rod 16 which extends downwardly from a platform (not shown) on which the cell is mounted. The rod extends into an internally threaded sleeve 18 which is mounted for rotation about its longitudinal axis, and a gear 20 is mounted on the lower end of the sleeve for operation thereof. The cell is prevented from rotating about the longitudinal axis of rod 16 so that rotation of sleeve 18 causes the cell to move vertically up and down, depending upon the direction of rotation of the sleeve. As the mechanism for operating gear 20 is shown in the above mentioned application of Jack Isreeli filed concurrently herewith, further description of the electrophoresis cell and its operating mechanism is considered unnecessary since the specific construction of the cell and its operating mechanism does not, per se, form part of the present invention.

The liquid examining apparatus comprises a source of radiation 22 for providing radiation in a range of wave lengths. For examining the protein content of blood serum, source 22 is selected to provide ultra-violet radiation, i.e. radiation having wave lengths in a range from 260 millimicrons to 290 millimicrons. A deuterium lamp provides a satisfactory source of ultra-violet radiation. The lamp is suitably mounted in a housing 24 which is secured to the inlet end of a radiation passage tube 26 and has an opening 28 for the passage of ultra-violet radiation from the source 22 into the inlet end of the tube.

A pair of longitudinally spaced condensing lenses 30 are suitably mounted in the tube, near its inlet end, and the forward condensing lens 30a focuses the radiation from source 22 at a horizontal slit 32 provided in a disk member 34 which is longitudinally spaced from lens 30a and is suitably mounted in the tube. As best seen in FIGS. 7 and 8, the disk member comprises a forward disk 36 having a circular aperture 38 and a rear disk 40 having a horizontal elongated aperture 42 in registry with aperture 38. An intermediate disk 44, provided with a narrow horizontal slit 32 is positioned between the rear and forward disks 36 and 40, respectively. The disk member 34 is secured in position in the tube 26 by screws 46 which extend into the end of the rear section 26a of the tube. The forward section 26b of the tube is connected to its rear section by the sleeve 48.

It is to be understood that all parts of the apparatus through which the required radiation is transmitted is made of material which transmits the radiation, and those parts of the apparatus through which the radiation does not pass is made of material, or is treated, so that it is opaque to the radiation. More particularly, the lenses in the apparatus are made of quartz or some other material which transmits ultra-violet radiation. Disk member 34 is opaque so that the radiation can only pass through the horizontal slit 32 in the form of a horizontal beam.

The beam is transmitted from disk member 34 to an opaque disk 50 which is mounted at the outlet end of radiation passage tube 26. The disk has a narrow horizontal slot 52 from which a vertically narrow beam of radiation passes to a collimating lens 54 which forms the beam into a series of rays which are parallel to each other and to the optical longitudinal axis 56 of light passage tube 26. Disk 50 prevents the widely divergent rays from slot 32 from being transmitted through the outlet end of tube 26, so that a relatively intense and concentrated beam of radiation is transmitted through lens 54.

The parallel rays pass through the outlet end of the tube and through an aperture 58 provided in a sleeve 60 which holds a radiation refracting prism 62. The prism has a front surface 64 which is normal to the optical axis 56 of radiation passage tube 26 and has a rear confronting surface 66 which forms an acute angle with said front surface, hereinafter referred to as the apex angle 68 of the prism.

The bundle of parallel rays which are transmitted to the prism from lens 54 are refracted during their transmission through the prism along different paths corresponding to the different wave lengths, respectively, of the radiation. More particularly, with the optical axis 56 at an angle of 18°25′ with the horizontal, and with an apex angle of the prism of 30°, ultraviolet radiation which has a wave length greater than 275 millimicrons is bent, by the prism, in a downwardly inclined direction in the form of a bundle of parallel rays, and radiation which has a wave length less than 275 millimicrons is bent in an upwardly inclined direction in the form of a bundle of parallel rays. Radiation which has a wave length of 275 millimicrons emerges from rear surface 66 of the prism in the form of a bundle of horizontal rays.

The radiation from the prism is transmitted through an aperture 70 provided in sleeve 60 to a condensing lens 72 which is mounted at the inlet end of a horizontal radiation passage tube 74. Lens 72 focuses the radiation onto an opaque disk 76 mounted at the outlet end of tube 74 and radiation of a wave length of 275 millimicrons passes through the horizontal slit 78 provided in the disk, while radiation of a greater wave length strikes the disk below the horizontal slit, and radiation of a lesser wave length strikes the disk above the horizontal slit, so that radiation of 275 millimicrons only is transmitted to one side of the electrophoresis cell 12, in the form of a horizontal beam which is narrow vertically and extends transversely of the cell in a horizontal direction.

It is to be noted that the exit slit 78 of the apparatus is positioned adjacent the side of the electrophoresis cell so that vertical movement of the cell relative thereto results in the movement, in succession, of the different layers, corresponding to the different constituents in the liquid, past the horizontal beam of radiation. It is to be understood that when an electric potential is applied for the electrophoretic operation, the different layers arrange themselves at different levels in the cell and the radiation beam strikes the side edges of the different layers in succession and is absorbed according to the quantity of the constituent present in its respective layer.

A horizontal radiation passage tube 80 is positioned at the other side of the cell and has its horizontal optical axis 82 in registry with the horizontal optical axis 84 of tube 74. The inlet end of tube 80 is positioned adjacent the other side of the cell and has a disk 86 provided with a horizontal slit 88 in registry with slot 78 of disk 76 to receive the non-absorbed radiation from the cell.

The radiation from the cell is transmitted through tube 80 to a pair of condensing lenses 90 which are longitudinally spaced from each other and rear lens 90a focuses the radiation from the cell at a predetermined position on the photomultiplier tube 14. In this manner, any deflection of the horizontal radiation during its passage through the cell does not prevent impingement of said radiation on the photomultiplier tube at a predetermined position thereof, which is in registry with the horizontal axis 82 of tube 80, thereby eliminating variations in the output of the multiplier tube due to excitation thereof by radiation which impinges on the tube at different positions.

A radiation shield 92 is mounted on the outlet end of tube 74 and a similar radiation shield 94 is mounted on the inlet end of tube 80. These shields are made of material which is opaque to ultra-violet radiation but transmits radiation within the visible range, thereby permitting the sides of the cell to be viewed by the operator while preventing any extraneous ultraviolet radiation from reaching the cell. Any suitable material may be used for this purpose, for example, polyvinylchloride acetate. A filter 96 which is opaque to radiation of wave lengths other than in the ultra-violet range is mounted in tube 80. This inhibits radiation, other than radiation within the ultra-violet range, from reaching the photomultiplier tube 14.

Pursuant to another aspect of the invention, the radiation which is transmitted to the electrophoresis cell can be of any wave length within the range of wave lengths of the radiation from source 22 which, in the present case, is the wave length range of ultra-violet radiation. As indicated above, the apex angle 68 of the prism 62 and the inclination angle of the longitudinal optical axis 56 of tube 26 were chosen so that radiation of 275 millimicrons is transmitted to the electrophoresis cell 12 in the form of a horizontal beam. By rotating the prism about its horizontal axis 98, which is perpendicular to the optical axis 56 of tube 26, radiation of different wave lengths from the source can be transmitted as a horizontal beam to the flow cell. By rotating the prism about its horizontal axis a total amount of about 3°, the wave length of the radiation which is transmitted as a horizontal beam can be varied from about 260 millimicrons to 290 millimicrons.

Referring now to FIGS. 2 to 6, the sleeve holder 60 for prism 62 is mounted in a housing 99 for rotation about horizontal axis 98 and the prism is fixed in its sleeve during rotation thereof. More particularly, the top 100 of the prism has a curvature which conforms to the curvature of the inner surface of the sleeve 60 and the bottom surface 102 of the prism is similarly curved to provide a very snug fit for the prism in its cylindrical sleeve holder 60. A circular member 104 is fixed in one end of the sleeve and has a part 106 which has a shoulder 108 that engages the rear portion of the rear surface 66 of the prism while the rear end of the prism abuts against the surface 110 of member 104. A resiliently compressible disk 112 is in abutting confronting relation with the front end of the prism and a metal disk 114, for example aluminum, is in abutting confronting relation with the front end of disk 112 and has a slip fit in sleeve 60. A locking ring 116 presses disk 114 against the resilient disk 112 and retains the prism in the sleeve, resiliently engaged at its ends between member 104 and disk 114.

It is to be noted that the sleeve 60 extends from the side of housing 99 and is grasped by a ring 118 which has a pair of laterally spaced arms 120 extending from the bottom of the ring. A rotary shaft 122 is mounted in housing 99 and has an eccentric part 124 which is positioned between arms 120 and is in sliding engagement therewith. The axis of part 124 is displaced below the axis of rotary shaft 122 so that as shaft 122 is rotated about its axis, eccentric 124 rotates about said axis and drives the arm 120 which causes ring 118 to rotate about its horizontal axis which is concentric with axis 98 of the prism. The ring is connected to the front extending end of sleeve 60 by screws 126, so that rotation of ring 118 rotates the sleeve and thereby rotates the prism about its horizontal axis 98. It is to be noted that due to the eccentric relation between the axis of part 124 and the axis of shaft 122, a relatively large rotation of shaft 122 only results in a relatively small rotation of ring 118, whereby precision rotation of the prism can be achieved due to the necessarily large rotation of shaft 122 to effect a relatively small rotation of the prism.

Sleeve 60 is held in housing 99 by the retaining ring 128 and ring 118. A dial 130 is connected to shaft 122, and is concentric with the axis of the shaft, for operating the shaft. A circular plate 132 is connected to housing 99 and has markings 134 on its face indicating different wave lengths of radiation. The dial contains an indicating marker 136 for operation in conjunction with the markings on the plate to indicate the wave lengths of the radiation which is being transmitted, in the form of a horizontal beam, to the electrophoresis cell.

Arms 120 are preferably separated from each other by a slot 138 so that the lateral position of the arms can be controlled by a screw 140 to provide a snug fit between the arms and the eccentric part 124 to eliminate any backlash. It will be understood that after the prism is rotated into position for providing radiation of a predetermined wave length, sleeve 60 is prevented from further rotation by locking screw 142 and shaft 122 is prevented from further rotation by locking screw 144.

Housing 99 holds the outlet end of radiation passage tube 26 in the position shown by the use of a locking screw 146. The housing also holds the inlet end of horizontal radiation passage tube 74 in the position shown by another locking screw 148. The photomultiplier tube 14 is held in a sleeve 150 which has an aperture 152 for the passage of the radiation from radiation passage tube 80 into the photomultiplier tube. The sleeve is mounted, with its axis horizontal, in a housing 154 and is held in position between arms 156 and 158 of the housing. A screw 160 clamps the arms against the sleeve 150. The outlet end of tube 80 is supported in housing 154 and is held in its horizontal position by lock screw 162.

Both housings 154 and 99 are mounted on a frame 164 provided with support legs 166 and 168, the latter being adjustable to raise or lower the apparatus with respect to a table support 170 or the like. The frame has a guide pin 172 which extends upwardly through a longitudinally extending slot 174 provided in housing 154. The housings have a series of guide pins 176 which extend into longitudinally extending grooves 178 provided in frame 164 to permit longitudinal adjusting movement of the radiation examining means on its frame. A clamping screw 180 is provided on housing 99 to lock the radiation examining means in its adjusted position on its frame.

It will be understood that the apex angle 68 of the prism and the angle of the optical axis 56 with the horizontal plane have been chosen so that, with a quartz prism, radiation having a wave length of 275 millimicrons is transmitted in the form of a horizontal beam to the electrophoresis cell. If other material, for example lithium fluoride, are used for the radiation transmitting parts of the apparatus, the apex angle of the prism and the angle of the optical axis 56 will differ in accordance with the radiation refracting properties of the material in order to provide a horizontal beam of radiation having a wave length of 275 millimicrons. This assumes, of course, that the forward surface 64 of the prism is perpendicular to the optical axis 56 of tube 26. As explained above, rotation of the prism results in the transmission of radiation of wave lengths, other than 275 millimicrons, in the form of a horizontal beam to the electrophoresis cell. It is to be understood that said wave length of 275 millimicrons is not critical and for examining the protein constituents of blood serum, ultra-violet radiation in the range indicated can be used. While the forward surface 64 of the prism has been described as perpendicular to the optical axis of tube 26, this relation is not vital, it being sufficient that the forward and rear surfaces be asymetrically disposed to the entrance and exit beams of the radiation, so that the prism is removed from the condition of minimum deviation.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

I claim:

1. In an electrophoresis apparatus for examining a liquid to determine the quantities of different substances present therein,
    an electrophoesis cell in which a series of different substances in a liquid are arranged in vertically spaced layers, a source of radiant energy for emitting radiation in a range of different wave lengths,
    a radiation passage tube positioned in the path of the radiation from said source for transmitting said radiation,
    a radiation-refracting prism mounted for rotation about an axis which is horizontal to the longitudinal axis of said tube,
    said prism having a pair of spaced confronting surfaces, one of said surfaces being in the path of the radiation transmitted through said tube for receiving said radiation for transmission through said prism and therefrom through said other surface,
    said surfaces being at an angle with respect to each other and said one surface being at an angle with respect to the longitudinal axis of said tube so that said radiation from said prism is transmitted along different paths corresponding to the different wave lengths of said radiation, and radiation of a particular wave length is transmitted along a predetermined path which is perpendicular to said cell,
    means positioned along said predetermined path for transmitting said radiation of said particular wave length only to said cell for the examination of the liquid therein by said radiation of said particular wave length, means for providing relative vertical movement between said cell and said radiation of said particular wavelength whereby said layers are examined by said last mentioned radiation seriatim,
    means for rotating said prims about said horizontal axis to change the angular relationship between said one surface of said prism and said longitudinal axis of said tube so that radiation of a different wave length than said particular wave length is transmitted to said cell,
    means for forming said radiation from said source into a relatively thin beam which extends laterally in a plane which is substantially parallel to said layers in said liquid,
    photo-electric means positioned to receive said radiation of predetermined wave length from said cell, and
    means in the path of the radiation from said cell for focusing said radiation at a predetermined position on said photo-electric device.

2. In an electrophoresis apparatus for examining a liquid to determine the quantities of different substances present therein, an electrophoresis cell in which a series of different substances in a liquid are arranged in vertically spaced layers, a source of radiant energy for emitting radiation in a range of different wave lengths, a radiation passage tube positioned in the path of the radiation from said source for transmitting said radiation, a radiation-refracting prism mounted for rotation about an axis which is horizontal to the longitudinal axis of said tube, said prism having a pair of spaced confronting surfaces, one of said surfaces being in the path of the radiation transmitted through said tube for receiving said radiation for transmission through said prism and therefrom through said other surface, said surfaces being at an angle with respect to each other and said one surface being at an angle with respect to the longitudinal axis of said tube so that said radiation from said prism is transmitted along different paths corresponding to the different wave lengths of said radiation, and radiation of a particular wave length is transmitted along a predetermined path, means positioned along said predetermined path for transmitting said radiation of said particular wave length only to said cell for the examination of the liquid therein by said radiation of said particular wave length, means for rotating said prism about said horizontal axis to change the angular relationship between said one surface of said prism and said longitudinal axis of said tube so that radiation of a different wave length than said particular wave length is transmitted to said cell, photo-electric means positioned to receive said radiation of predetermined wave length from said cell, and means in the path of the radiation from said cell for focusing said radiation at a predetermined position on said photo-electric device.

3. Apparatus for examining vertically spaced, horizontal layers of liquid in an electrophoresis cell, comprising:

a source of radiant energy for emitting radiation in a range of different wave lengths, a radiation passage tube positioned in the path of the radiation from said source for transmitting said radiation, a sleeve holder mounted for rotation about a horizontal axis and positioned in the path of radiation from said radiation passage tube, a radiation-refracting prism mounted within said sleeve holder and having a pair of spaced confronting surfaces, one of said surfaces being in the path of the radiation transmitted through said tube for receiving said radiation for transmission through said prism and therefrom through said other surface, said surfaces being at an angle with respect to each other and said one surface being at an angle with respect to the longitudinal axis of said tube so that said radiation from said prism is transmitted along different paths corresponding to the different wave lengths of said radiation, and radiation of a particular wave length is transmitted along a predetermined path, means for rotating said sleeve holder to vary the angle of said one prism surface with respect to the longitudinal axis of said tube to vary the wave length of the radiation transmitted along said predetermined path, and means positioned along said predetermined path for transmitting said radiation of said particular wave length only to said cell for the examination of the liquid therein by said radiation of said particular wave length.

4. Apparatus for examining vertically spaced, horizontal layers of liquid in an electrophoresis cell, comprising:

a source of radiant energy for emitting radiation in a range of different wave lengths, a radiation passage tube positioned in the path of the radiation from said source for transmitting said radiation, a sleeve holder mounted for rotation about a horizontal axis which is perpendicular to the longitudinal axis of said tube, a radiation-refracting prism mounted within said sleeve holder, said prism having a pair of spaced confronting surfaces, one of said surfaces being in the path of the radiation transmitted through said tube for receiving said radiation for transmission through said prism and therefrom through said other surface, said surfaces being at an angle with respect to each other and said one surface being at an angle with respect to the longitudinal axis of said tube so that said radiation from said prism is transmitted along different paths corresponding to the different wave lengths of said radiation, and radiation of a particular wave length is transmitted along a predetermined path, means positioned along said predetermined path for transmitting said radiation of said particular wave length only to said cell for the examination of the liquid therein by said radiation of said particular wave length, and means for rotating said sleeve holder about said horizontal axis to change the angular relationship between said one surface of said prism and said longitudinal axis of said tube so that radiation of a different wave length than said particular wave length is transmitted to said cell.

5. In electrophoresis apparatus including an electrophoresis cell in which a series of different substances in a liquid are arranged in vertically spaced layers; means for examining said liquid to determine the quantities of said substances, said examining means comprising:

a source of radiant energy for emitting radiation in a range of different wave lengths, a radiation passage tube positioned in the path of the radiation from said source for transmitting said radiation, a sleeve holder mounted for rotation about a horizontal axis which is perpendicular to the longitudinal axis of said tube, a radiation-refracting prism mounted within said sleeve holder and having a pair of spaced confronting surfaces, one of said surfaces being in the path of the radiation transmitted through said tube for receiving said radiation for transmission through said prism and therefrom through said other surface, said surfaces being at an angle with respect to each other and said one surface being at an angle with respect to the longitudinal axis of said tube so that radiation from said prism is transmitted along different paths corresponding to the different wave lengths of said radiation, and radiation of a particular wave length is transmitted along a predetermined path which is perpendicular to said cell, means for rotating said sleeve holder to vary the angle of said one prism surface with respect to the longitudinal axis of said tube to vary the wave length of the radiation transmitted along said predetermined path, and means positioned along said predetermined path for transmitting said radiation of said particular wave length only to said cell for the examination of the liquid therein by said radiation of said particular wave length, and means for providing relative vertical movement between said cell and said radiation of said particular wave length whereby said layers are examined by said last mentioned radiation seriatim.

6. In electrophoresis apparatus including an electrophoresis cell in which a series of different substances in a liquid are arranged in vertically spaced layers; means for examining said liquid to determine the quantities of said substances, said examining means comprising:

a source of radiant energy for omitting radiation in a range of different wave lengths, a radiation passage tube positioned in the path of the radiation from said source for transmitting said radiation, a sleeve holder mounted for rotation about a horizontal axis which is perpendicular to the longitudinal axis of said tube, a radiation-refracting prism mounted within said sleeve holder and having a pair of spaced confronting surfaces, one of said surfaces being in the path of the radiation transmitted through said tube for receiving said radiation for transmission through said prism and therefrom through said other surface, said surfaces being at an angle with respect to each other and said one surface being at an angle with respect to the longitudinal axis of said tube so that said radiation from said prism is transmitted along different paths corresponding to the different wave lengths of said radiation, and radiation of a particular wave length is transmitted along a predetermined path which is perpendicular to said cell, means for rotating said sleeve holder to vary the angle of said one prism surface with respect to the longitudinal axis of said tube to vary the wave length of the radiation transmitted along said predetermined path, means positioned along said predetermined path for transmitting said radiation of said particular wave length only to said cell for the examination of the liquid therein by said radiation of said particular wave length, means for providing relative vertical movement between said cell and said radiation of said particular wave length whereby said layers are examined by said last mentioned radiation seriatim, means for forming said radiation from said source into a relatively thin beam which extends laterally in a plane which is substantially parallel to said layers in said liquid.

7. In an electrophoresis apparatus for examining a liquid to determine the quantities of different substances present therein, An electrophoresis cell in which a series of different substances are arranged in vertically spaced layers, a source of radiant energy for emitting radiation in a range of different wave lengths, a radiation passage tube positioned in the path of the radiation from said source for transmitting said radiation, a radiation-refracting prism mounted for rotation about a horizontal axis which is perpendicular to the longitudinal axis of said tube, said prism having a pair of spaced confronting surfaces, one of said surfaces being in the path of the radiation transmitted through said tube for receiving said radiation for transmission through said prism and therefrom through said other surface, said surfaces being at an angle with respect to each other and said one surface being at an angle with respect to the longitudinal axis of said tube so that said radiation from said prism is transmitted along different paths corresponding to the different wave lengths of said radiation, and radiation of a particular wave length is transmitted along a predetermined path which is perpendicular to said cell, means positioned along said predetermined path for transmitting said radiation of said particular wave length only to said cell for the examination of the liquid therein by said radiation of said particular wave length, means for providing relative vertical movement between said cell and said radiation of said particular wave length whereby said layers are examined by said last mentioned radiation seriatim, and means for rotating said prism about said horizontal axis to change the angular relationship between said one surface of said prism and said longitudinal axis of said tube so that radiation of a different wave length than said particular wave length is transmitted to said cell.

8. In an electrophoresis apparatus for examining a liquid to determine the quantities of different substances present therein, an electrophoresis cell in which a series of different substances in a liquid are arranged in vertically spaced layers, a source of radiant energy for emitting radiation in a range of different wave lengths, a radiation passage tube positioned in the path of the radiation from said source for transmitting said radiation, a radiation-refracting prism mounted for rotation about a horizontal axis which is perpendicular to the longitudinal axis of said tube, said prism having a pair of spaced confronting surfaces, one of said surfaces being in the path of the radiation transmitted through said tube for receiving said radiation for transmission through said prism and therefrom through said other surface, said surfaces being at an angle with respect to each other and said one surface being at an angle with respect to the longitudinal axis of said tube so that said radiation from said prism is transmitted along different paths corresponding to the different wave lengths of said radiation, and radiation of a particular wave length is transmitted along a predetermined path which is perpendicular to said cell, means positioned along said predetermined path for transmitting said radiation of said particular wave length only to said cell for the examination of the liquid therein by said radiation of said particular wave length, means for providing relative vertical movement between said cell and said radiation of said particular wave length whereby said layers are examined by said last mentioned radiation seriatim, means for rotating said prism about said horizontal axis to change the angular relationship between said one surface of said prism and said longitudinal axis of said tube so that radiation of a different wave length than said particular wave length is transmitted to said cell, and means for forming said radiation from said source into a relatively thin beam which extends laterally in a plane which is substantially parallel to said layers in said liquid.

9. In electrophoresis apparatus including an electrophoresis cell in which a series of different substances in a liquid are arranged in vertically spaced layers; means for examining said liquid to determine the quantities of said substances, said examining means comprising:

a source of radiant energy for emitting radiation in a range of different wave lengths, a radiation passage tube positioned in the path of the radiation from said source for transmitting said radiation, a sleeve holder mounted for rotation about a horizontal axis which is perpendicular to the longitudinal axis of said tube, a radiation-refracting prism mounted within said sleeve holder and having a pair of spaced confronting surfaces, one of said surfaces being in the path of the radiation transmitted through said tube for receiving said radiation for transmission through said prism and therefrom through said other surface, said surfaces being at an angle with respect to each other and said one surface being at an angle with respect to the longitudinal axis of said tube so that said radiation from said prism is transmitted along different paths corresponding to the different wave lengths of said radiation, and radiation of a particular wave length is transmitted along a predetermined path which is perpendicular to said cell, means for rotating said sleeve holder to vary the angle of said one prism surface with respect to the longitudinal axis of said tube to vary the wave length of the radiation transmitted along said predetermined path, means positioned along said predetermined path for transmitting said radiation of said particular wave length to said cell for the examination of the liquid therein by said radiation of said particular wave length, means for providing relative vertical movement between said cell and said radiation of said particular wave length whereby said layers are examined by said last mentioned radiation seriatim, photo-electric means positioned to receive said radiation of predetermined wave length from said cell, and means in the path of the radiation from said cell for focusing said radiation at a predetermined position on said photo-electric device.

10. In electrophoresis apparatus including an electrophoresis cell in which a series of different substances in a liquid are arranged in vertically spaced layers; means for examining said liquid to determine the quantities of said substances, said examining means comprising:

a source of radiant energy for emitting radiation in a range of different wave lengths, a radiation passage tube positioned in the path of the radiation from said source for transmitting said radiation, a sleeve holder mounted for rotation about a horizontal axis which is perpendicular to the longitudinal axis of said tube, a radiation-refracting prism mounted within said sleeve holder having a pair of spaced confronting surfaces, one of said surfaces being in the path of the radiation transmitted through said tube for receiving said radiation for transmission through said prism and therefrom through said other surface, said surfaces being at an angle with respect to each other and said one surface being at an angle with respect to the longitudinal axis of said tube so that said radiation from said prism is transmitted along different paths corresponding to the different wave lengths of said radiation, and radiation of a particular wave length is transmitted along a predetermined path which is perpendicular to said cell, means for rotating said sleeve holder to vary the angle of said one prism surface with respect to the longitudinal axis of said tube to vary the wave length of the radiation transmitted along said predetermined path, means positioned along said predetermined path for transmitting said radiation of said particular wave length only to said cell for the examination of the liquid therein by said radiation of said particular wave length, means for providing relative vertical movement between said cells and said radiation of said particular wave length whereby said layers are examined by said last mentioned radiation seriatim, means for forming said radiation from said source into a relatively thin beam which extends laterally in a plane which is substantially parallel to said layers in said liquid, photo-electric means positioned to receive said radiation of predetermined wave length from said cell, and means in the path of the radiation from said cell for focusing said radiation at a predetermined position on said photo-electric device.

11. Electrophoresis apparatus, comprising:

a vertical electrophoresis cell in which the constituents of a liquid are arranged in different layers at different vertically spaced levels, respectively;

means for examining said layers to determine the quantity of each constituent in each of said layers; and means for moving said cell and said examining means in relative vertical rectilinear directions for examination of each of said layers seriatim;

said examining means including;

a source of radiant energy for emitting radiation in a range of different wave lengths, a radiation passage tube positioned with its longitudinal optical axis at an acute angle with the horizontal and having an outlet end and an inlet end which is positioned to receive said radiation from said source, condensing lens means positioned in said tube near said inlet end for focusing said radiation at a position in said tube, an opaque member positioned at said position of the focused radiation and having a horizontal slot in the path of said focused radiation to form a relatively thin beam of radiation which is short in a vertical direction and which extends laterally in a horizontal direction, a collimating lens positioned at said outlet end of said tube in position to receive said beam of radiation and form said radiation beam into a series of parallel rays, a radiation-refracting prism having a pair of spaced confronting surfaces, one of said surfaces being normally perpendicular to said optical axis of said tube and in position to receive said radiation beam of parallel rays, and said other surface of said prism being at an acute angle to said one surface, said acute angles of said optical axis and said surfaces of said prism being such that radiation of a predetermined wave length is transmitted from said other surface of said prism as a series of parallel horizontal rays, another radiation passage tube positioned with its longitudinal optical axis horizontal and with its inlet end positioned to receive said radiation from said other surface of said prism and with its outlet end positioned at one side of said cell, another opaque member positioned at said outlet end of said other tube and having a horizontal slot therein to transmit said thin beam of radiation of said predetermined wave length only to said cell, and a focusing lens positioned in the path of the radiation from said prism for focusing said horizontal rays of said predetermined wave length on said last mentioned slot.

12. Electrophoresis apparatus, comprising:

a vertical electrophoresis cell in which the constituents of a liquid are arranged in different layers at different vertically spaced levels, respectively;

means for examining said layers to determine the quantity of each constituent in each of said layers; and means for moving said cell and said examining means in relative vertical rectilinear directions for examination of each of said layers seriatim;
said examining means including:
a source of radiant energy for emitting radiation in a range of different wave lengths,
a radiation passage tube positioned with its longitudinal optical axis at an acute angle with the horizontal and having an outlet end and an inlet end which is positioned to receive said radiation from said source,
condensing lens means positioned in said tube near said inlet end for focusing said radiation at a position in said tube,
an opaque member positioned at said position of the focused radiation and having a horizontal slot in the path of said focused radiation to form a relatively thin beam of radiation which is short in a vertical direction and which extends laterally in a horizontal direction,
a collimating lens positioned at said outlet end of said tube in position to receive said beam of radiation and form said radiation beam into a series of parallel rays,
a radiation-refracting prism having a pair of spaced confronting surfaces, one of said surfaces being normally perpendicular to said optical axis of said tube and in position to receive said radiation beam of parallel rays, and said other surface of said prism being at an acute angle to said one surface, said acute angles of said optical axis and said surfaces of said prism being such that radiation of a predetermined wave length is transmitted from said other surface of said prism as a series of parallel horizontal rays,
another radiation passage tube positioned with its longitudinal optical axis horizontal and with its inlet end positioned to receive said radiation from said other surface of said prism and with its outlet end positioned at one side of said cell,
another opaque member positioned at said outlet end of said other tube and having a horizontal slot therein to transmit said thin beam of radiation of said predetermined wave length only to said cell,
a focusing lens positioned in the path of the radiation from said prism for focusing said horizontal rays of said predetermined wave length on said last mentioned slot,
another horizontal radiation passage tube having its horizontal longitudinal optical axis in registry with said last mentioned passage tube and having an outlet end and an inlet end which is in position to receive radiation from said cell,
photo-electric means positioned at said outlet end of said other horizontal tube, and
lens means positioned in said other horizontal tube to receive said radiation from said cell and focus said radiation at a predetermined position on said photo-electric means.

13. Electrophoresis apparatus, comprising:
a vertical electrophoresis cell in which the constituents of a liquid are arranged in different layers at different vertically spaced levels, respectively;
means for examining said layers to determine the quantity of each constituent in each of said layers; and
means for moving said cell and said examining means in relative vertical rectilinear directions for examination of each of said layers seriatim;
said examining means including:
a source of radiant energy for emitting radiation in a range of different wave lengths,
a radiation passage tube positioned with its longitudinal optical axis at an acute angle with the horizontal and having an outlet end and an inlet end which is positioned to receive said radiation from said source,
condensing lens means positioned in said tube near said inlet end for focusing said radiation at a position in said tube,
an opaque member positioned at said position of the focused radiation and having a horizontal slot in the path of said focused radiation to form a relatively thin beam of radiation which is short in a vertical direction and which extends laterally in a horizontal direction,
a collimating lens positioned at said outlet end of said tube in position to receive said beam of radiation and form said radiation beam into a series of parallel rays,
a radiation-refracting prism having a pair of spaced confronting surfaces, one of said surfaces being normally perpendicular to said optical axis of said tube and in position to receive said radiation beam of parallel rays, and said other surface of said prism being at an acute angle to said one surface, said acute angles of said optical axis and said surfaces of said prism being such that radiation of a predetermined wave length is transmitting from said other surface of said prism as a series of parallel horizontal vertically spaced rays,
another radiation passage tube positioned with its longitudinal optical axis horizontal and with its inlet end positioned to receive said radiation from said other surface of said prism and with its outlet end positioned at one side of said cell,
another opaque member positioned at said outlet end of said other tube and having a horizontal slot therein to transmit said thin beam of radiation of said predetermined wave length only to said cell,
a focusing lens positioned in the path of the radiation from said prism for focusing said horizontal rays of said predetermined wave length on said last mentioned slot, and
a third opaque member positioned before said other opaque member and having a horizontal slot in the path of the radiation to reduce the divergence of the rays of radiation.

14. Electrophoresis apparatus, comprising:
a vertical electrophoresis cell in which the constituents of a liquid are arranged in different layers at different vertically spaced levels, respectively,
means for examining said layers to determine the quantity of each constituent in each of said layers, and
means for moving said cell and said examining means in relative vertical rectilinear directions for examination of each of said layers seriatim,
said examining means including:
a source of radiant energy for emitting radiation in a range of different wave lengths,
a radiation passage tube positioned with its longitudinal optical axis at an acute angle with the horizontal and having an outlet end and an inlet end which is positioned to receive said radiation from said source,
condensing lens means positioned in said tube near said inlet end for focusing said radiation at a position in said tube,
an opaque member positioned at said position of the focused radiation and having a horizontal slot in the path of said focused radiation to form a relatively thin beam of radiation which is short in a vertical direction and which extends laterally in a horizontal direction,
a collimating lens positioned at said outlet end of said tube in position to receive said beam of radiation and form said radiation beam into a series of parallel rays,
a radiation-refracting prism mounted for rotation about a horizontal axis and having a pair of spaced confronting surfaces, one of said surfaces being normally perpendicular to said optical axis of said tube and in position to receive said radiation beam of parallel rays, and said other surface of said prism being at an acute angle to said one surface, said acute angles of said optical axis and said surfaces of said prism being such that radiation of a predetermined wave length is transmitted from said other surface of said prism as a series of parallel horizontal vertically spaced rays, another radiation passage tube positioned with its longitudinal optical axis horizontal and with its inlet end positioned to receive said radiation from said other surface of said prism and with its outlet end positioned at one side of said cell, another opaque member positioned at said outlet end of said other tube and having a horizontal slot therein to transmit said thin beam of radiation of said predetermined wave length only to said cell, a focusing lens positioned in the path of the radiation from said prism for focusing said horizontal rays of said predetermined wave length on said last mentioned slot, and means for rotating said prism about said horizontal axis to change the angular relationship between said one surface of said prism and said optical axis of said first mentioned tube so that radiation of a wave length which is different from said predetermined wave length is transmitted from said other surface of said prism as a series of parallel horizontal rays.

References Cited by the Examiner
UNITED STATES PATENTS

| | | | |
|---|---|---|---|
| 1,709,809 | 4/1929 | Rashevsky | 250—226 X |
| 1,877,501 | 9/1932 | Exton | 250—226 X |
| 2,412,602 | 12/1946 | Chambers et al. | 88—14 |
| 2,762,254 | 9/1956 | Kegeles | 204—180 |

RALPH G. NILSON, *Primary Examiner.*

WALTER STOLWEIN, *Examiner.*